United States Patent [19]

Bacon

[11] 4,015,407
[45] Apr. 5, 1977

[54] MOWER WITH SHOCK MOUNTS

[75] Inventor: Roger J. Bacon, Holland, Wis.

[73] Assignee: FMC Corporation, San Jose, Calif.

[22] Filed: Oct. 8, 1975

[21] Appl. No.: 620,898

[52] U.S. Cl. .................................. 56/255; 56/12.6; 56/17.2

[51] Int. Cl.² ......................................... A01D 35/26

[58] Field of Search ................ 56/255, 12.6, 17.5, 56/320.1, 320.2, 17.2, DIG. 18; 180/19 R, 19 H, 19 S; 280/47.34, 47.36, 47.37; 248/9, 22

[56] References Cited

UNITED STATES PATENTS

| 1,914,782 | 6/1933 | McCarty | 56/DIG. 18 |
| 2,578,880 | 12/1951 | Doyle | 56/255 X |
| 3,056,249 | 10/1962 | Shaw | 56/12.6 |
| 3,138,910 | 6/1964 | Price et al. | 56/17.5 X |
| 3,901,003 | 8/1975 | Erdman | 56/12.6 |

*Primary Examiner*—J.N. Eskovitz
*Attorney, Agent, or Firm*—A. J. Moore; C. E. Tripp

[57] ABSTRACT

A mower is provided having an engine, handle bar assembly, and handle height adjustment braces connected to the mobile housing of the mower through resilient shock mounts for reducing engine noise and vibration; and for isolating the operator from the engine vibrations, as well as from ground induced vibrations and shocks while at the same time utilizing certain of the shock mounts for resiliently urging the handle height adjustment braces against the handle bar assembly to aid in retaining the braces coupled to the handle bar assembly.

3 Claims, 3 Drawing Figures

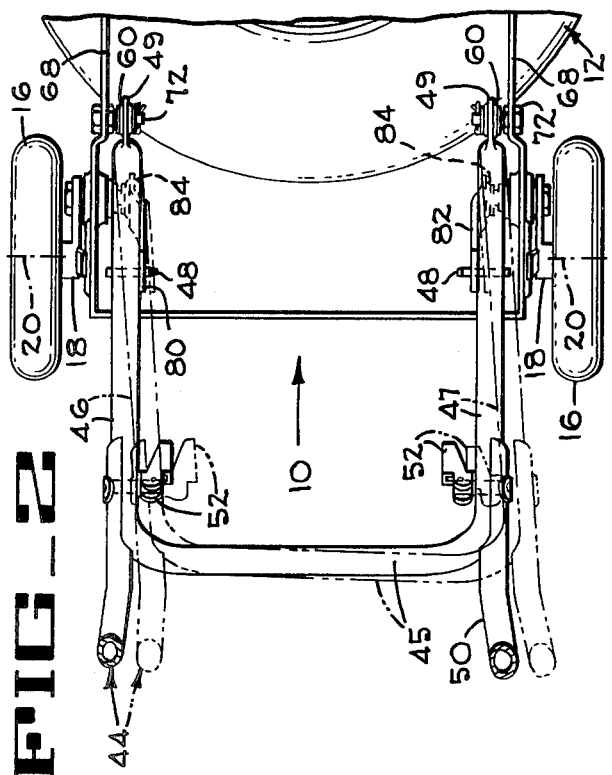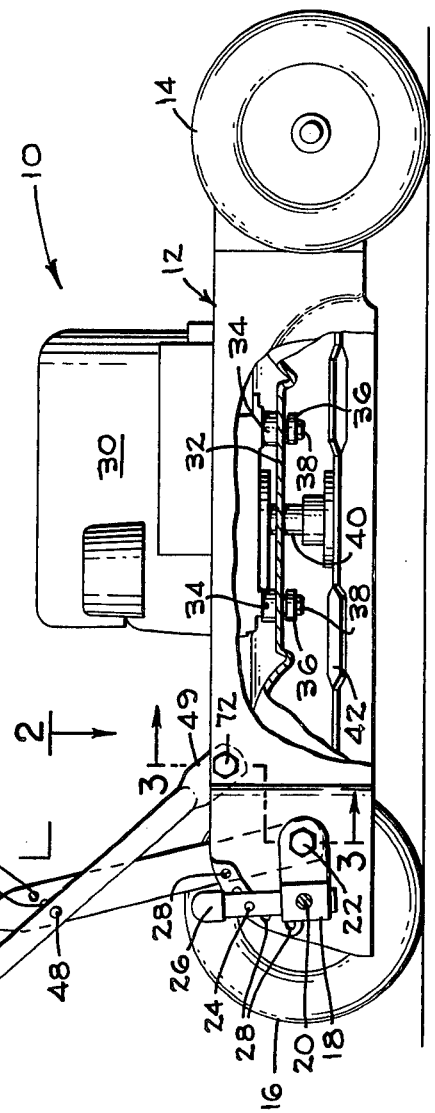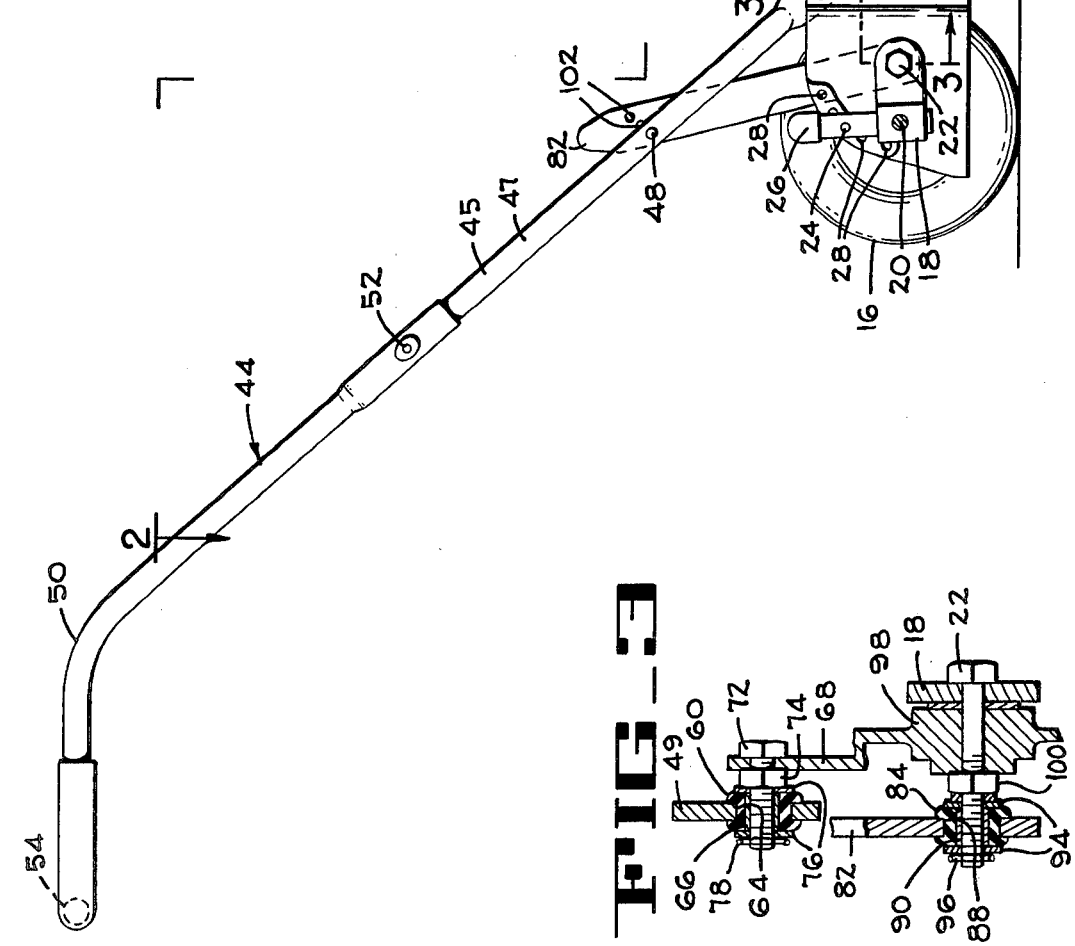

MOWER WITH SHOCK MOUNTS

BACKGROUND OF THE INVENTION

1. Field of the Invention

This invention relates to mowers and more particularly to an improved manner of mounting the engine, handle bar assembly, and height adjustment braces to the mower housing for reducing noise, shock and vibration.

2. Description of the Prior Art

When using lawn and garden type vehicles, the desirability of minimizing noise due to vibrations as well as noise due to engine exhausts is becoming more and more apparent and certain governmental agencies have passed strict noise ordinances that must be complied with. Noise problems in such mowers are partially due to engine vibrations and vibrations or shocks which occur due to the vehicle being moved over rough ground. These vibrations and shocks, if not dampened, are transmitted to the rather large sheet metal or the like mower housing which tends to resonate thereby causing excessive noise.

It is also desirable, for the operator's convenience and comfort, to minimize the transmission of engine and ground induced vibrations and shocks to the operator. In prior art mowers, severe transverse shocks or jolts occur when a wheel on one side of the mower is abruptly raised or lowered, and such shocks are transmitted directly to the operator through the handle bar assembly. Such shocks frequently occur when the mower is used to mow grass in rough fields.

In accordance with the present invention, the above mentioned disadvantages of existing mowers have been minimized by merely isolating the engine, handle bar assembly and handle height adjustment braces from the housing or body of the mower with resilient shock mounts. In addition, the resilience in those shock mounts connecting the handle height adjustment braces to the handle bar assembly is used to aid in simply and economically maintain an adjustable pin and aperture connection between the handle bars and the height adjustment braces. The last mentioned shock mounts also allow considerable transverse floating of the mower housing relative to the upper end of the handle bar assembly as would occur when one side of the mower is abruptly raised or lowered relative to the other side.

It is of course recognized that resilient mounts are known per se for reducing vibrations in many different types of mechanisms. Such vibration mounts are illustrated in U.S. Pat. No 2,196,428 which issued to Saurer or Apr. 9, 1940 and discloses the use of resilient mounts to dampen vibrations between an engine and the frame of the vehicle. U.S. Pat. No. 2,208,532 which issued of July 16, 1940 to Woodward illustrates similar shock mounts associated with other articles such as radios; while U.S. Pat. No. 2,884,100 which issued to McGee, Jr. on Apr. 28, 1959 discloses resilient sealing or shock fastening means for connecting corrugated sheathing together. U.S. Pat. No. 3,429,533 which issued to Harkness on Feb. 25, 1969 discloses horizontal vibration mounts or snubbers for vertical shaft engines such as used on mowers or the like; while U.S. Pat. No. 3,636,885 which issued to Cunningham on Jan. 25, 1972 discloses the use of similar shock mounts in the railroad vehicle environment.

SUMMARY OF THE INVENTION

In accordance with the present invention engine vibration transmitted to the operator is greatly reduced by three separate groups of shock mounts; one group being disposed between the mower housing and the engine, a second grouping disposed between the mower housing and the handle bar assembly, and the third group being disposed between the mower housing and the handle height adjustment braces. Also, the transmission of ground induced shocks to the operator due to movement over rough ground is reduced by the second and third groups of shock mounts. The third group of shock mounts further serves to aid in coupling or uncoupling handle height adjustment braces to the handle bar assembly at the desired height and yet permit the handle bar assembly to pivot or float transversely of the mower housing when a wheel on one side of the mower is abruptly raised or lowered relative to wheels on the other side of the mower such as would occur when mowing rough fields or the like. All of the shock mounts cooperate to reduce objectionable noise.

According to the present invention, a mower is provided which includes a housing, wheels supporting the housing for movement over the ground, an engine, and a handle bar assembly including a pair of support arms with lower mounting ends. The improvement comprises a first groups of resilient shock mounts connecting the engine to the housing defining a first vibration barrier for minimizing engine induced vibrations from being transmitted to the housing, a second group of resilient shock mounts connecting the lower ends of the handle bar assembly to the housing, a pair of height adjusting braces having upper and lower ends, a third group of resilient shock mounts connecting the lower ends of the braces to the housing with the upper ends being disposed adjacent associated ones of said arms, and means connecting the upper ends of said braces to the associated ones of said arms, said second and third groups of resilient shock mounts being effective to provide a second vibration barrier for minimizing engine induced vibration from being transmitted to the upper end of the handle bar assembly, said second and third groups of resilient shock mounts also being arranged to permit limited transverse movement of the upper end of the handle bar asssembly relative to the housing for minimizing transmission of shock forces to the upper end of the handle bar assembly due to movement of the mower over rough ground.

BRIEF DESCRIPTION OF THE DRAWINGS

FIG. 1 is an elevation of the mower of the present invention with certain parts being cut away to illustrate a first group of resilient shock mounts associated with the engine.

FIG. 2 is a plan of a portion of the mower taken between lines 2—2 of FIG. 1 illustrating certain resilient mounts for supporting a handle bar assembly; and further illustrating the transverse movement in one direction of the upper end of the handle bar assembly relative to the mower housing with the amount of movement being exaggerated.

FIG. 3 is a section taken along lines 3—3 of FIG. 1 illustrating resilient mounts of a second and third group of mounts associated with the handle bar assembly and the handle height adjustment braces.

DESCRIPTION OF THE PREFERRED EMBODIMENT

The mower 10 (FIG. 1) of the present invention is illustrated as a rotary mower having a large housing 12, constructed primarily of sheet metal or the like, to which all components of the mower are attached. The housing is supported by front wheels 14 and rear wheels 16 with the rear wheels being journaled on mower height adjustment devices 18 about axes 20. The height adjustment devices 18 are pivoted about bolts 22 secured to the housing and are held in adjusted position by pins 24 secured to the spring arms 26 and receivable in selected ones of arcuately arranged holes 28 in the housing 12. An engine 30 is supported on the deck 32 of the mower housing by a group of upper and lower resilient shock mounts 34,36 and cooperating cap screws 38. The group of mounts preferably include four pairs of upper and lower mounts. The engine 30 drives a shaft 40 having a cutter blade 42 of well known design secured thereto.

A handle bar assembly 44 comprises a lower generally U-shaped section 45 including upstanding arms 46 and 47 with inwardly projecting pins 48 rigidly secured to each arm above the lower end portions 49 of the arms which end portions are apertured and flattened.

An upper generally U-shaped section 50 of the handle bar assembly 44 is joined to the lower section 45 as indicated in FIG. 2 by quick release connectors 52 which permit the upper section to be folded downwardly for convenience in storage. Both sections 45 and 50 are formed from thin walled tubular material which when in the illustrated operative position are somewhat flexible to allow limited transverse deflection between an upper cross bar 54 of the upper section 50, when gripped by an operator, and the lower end portion 49 when connected to the mower housing 12.

The lower end portion 49 of the handle bar assembly 44 is connected to the mower housing 12 through a second group or pair of shock mounts 60 (FIGS. 2 and 3). Each flattened lower end portion 49 (FIG. 3) receives one of the shock mounts. The mounts 60 are preferably in the form of grommets having an outer annular groove 64 fitted in the aperture and being centrally bored to receive a tubular spacer 66. Each mount 60 is pivotally connected to an associated upstanding wall 68 of the housing 12 by bolt 72 (FIG. 3) secured to the wall by a nut 74. The bolt 72 extends through the associated spacer 66 and through a pair of washers 76, which washers are held from axial displacement by a cotter pin or the like 78.

The height of the handle bar assembly 44 is vertically adjusted to suit the operator, and is held at the desired height by height adjusting braces 80 and 82 (FIG. 2). The braces are connected to the mower housing 12 by a third pair or group of shock mounts 84. As indicated in FIG. 3, each shock mount is preferably in the form of a grommet that is centrally bored and has an annular peripheral groove 88 fitted in a hole in the lower end of the associated brace 80,82.

A tubular spacer 90 is fitted in the hole of the grommet and is pivotally received on the end portion of the bolt 22 between washers 94 which are held in place by a cotter pin or the like 96. The bolts are each threaded into thick portions 98 of the associated wall 68 of the housing 12 and are locked in place by nuts 100. The aforementioned pins 48 (FIGS. 1 and 2) are each slidably received in apertures 102 which may be an elongated slot, or a selected one of a plurality of holes in the upper end portion of associated braces 80,82 as indicated in FIG. 1. If desired, the free end portions of the pins 48 may be drilled to receive one leg of a snap pin (not shown) to positively prevent accidental disengagement of the pins 48 from the apertures 102.

An important feature of the invention is that the resilient shock mounts 60 and 84 allow the upper end of the handle bar assembly 44 to transversely float relative to the mower housing 12. In this regard the shock mounts 60,84 permit a limited amount of both radial movement and transverse pivotal movement of the arms 46,47 and braces 80,82 relative to the associated bolts 72 and 22, respectively. The shock mounts 84 resiliently maintain the upper ends of the braces 80,82 against the inside surfaces of the arms 46,47 with sufficient force to maintain engagement with the pins 48 under normal conditions and cooperate with the shock mounts 60 to considerably dampen transverse shocks from reaching the operator due to movement of the mower over rough ground. Also, the resilient mounts 60 and 84 permit movement of the upper ends of the braces 80,82 inwardly relative to the arms 46,47 to easily couple or uncouple the pins 48 from their height adjustment apertures 102.

Thus, by resiliently mounting the lower ends of the handle bar assembly 44 and the height adjustment braces 80,82 to the housing 12 as previously described, the handle bar assembly may be deflected transversely from the solid line position to approximately the dotted line position (FIG. 2) toward one side of the mower as illustrated, and may likewise be moved a similar distance toward the other side of the mower. Furthermore, if the apertures 102 are elongated slots rather than separate holes as illustrated in FIG. 1, then the handle bar assembly may also be deflected a short distance longitudinally of the mower.

In addition to minimizing ground induced shocks from reaching the operator, vibration transmitted to the housing 12 by the engine 30 is initially dampened by the first group of mounts 34,36 and is further dampened by the shock mounts 60,84 before being transmitted to the operator. Thus, the operator is protected from engine vibrations by three separate groups of resilient mounts which cooperate to progressively reduce engine vibrations that would otherwise be transmitted to the operator. The three groups of shock mounts also cooperate to minimize objectionable engine and ground induced noise.

From the foregoing description it is apparent that the mower of the present invention includes three groups of resilient shock mounts which minimize transmission of engine vibrations from reaching the operator; while two of the groups of shock mounts also reduce transmission of shocks, especially transverse shocks, to the operator caused by the mower movng over rough ground. A second advantage of the groups of shock mounts is that the mounts aid in reducing resonance of the housing, caused by both engine induced and ground induced vibration and shock, and accordingly reduce noise caused by the mower.

Although the best mode contemplated for carrying out the present invention has been herein shown and described, it will be apparent that modification and variation may be made without departing from what is regarded to be the subject matter of the invention.

I claim:

1. In a mower having a housing, wheels supporting the housing for movement over the ground, an engine, and a handle bar assembly including a pair of support arms with lower mounting ends; the improvement which comprises a first group of resilient shock mounts connecting the engine to the housing defining a first vibration barrier for minimizing engine induced vibration from being transmitted to the housing, a second group of resilient shock mounts connecting the lower ends of the handle bar arms to the housing, a pair of height adjusting braces having upper and lower ends, a third group of resilient shock mounts connecting the lower ends of the braces to the housing with the upper ends being disposed adjacent associated ones of said arms, and means connecting the upper ends of said braces to the associated ones of said arms, said second and third groups of resilient shock mounts being effective to provide a second vibration barrier for minimizing engine induced vibrations from being transmitted to the upper end of the handle bar assembly, said second and third groups of resilient shock mounts also being arranged to permit transverse movement of the upper end of the handle bar assembly relative to the housing for minimizing transmission of shock forces to the upper end of the handle bar assembly due to movement of the mower over rough ground, said third group of shock mounts being arranged to urge the upper ends of the height adjusting braces against the associated handle bar arms.

2. In a mower having a housing, wheels supporting the housing for movement over the ground, an engine, and a handle bar assembly including a pair of support arms with lower mounting ends; the improvement which comprises a first groups of resilient shock mounts connecting the engine to the housing defining a first vibration barrier for minimizing engine induced vibration from being transmitted to the housing, a second group of resilient shock mounts connecting the lower ends of the handle bar arms to the housing, a pair of height adjusting braces having upper and lower ends, a third group of resilient shock mounts connecting the lower ends of the braces to the housing with the upper ends being disposed adjacent associated ones of said arms, and means connecting the upper ends of said braces to the associated ones of said arms, said second and third groups of resilient shock mounts being effective to provide a second vibration barrier for minimizing engine induced vibrations from being transmitted to the upper end of the handle bar assembly, said second and third groups of resilient shock mounts also being arranged to permit transverse movement of the upper ends of the handle bar assembly relative to the housing for minimizing transmission of shock forces to the upper end of the handle bar assembly due to movement of the mower over rough ground, said third group of shock mounts being arranged to urge the upper ends of the height adjusting braces against the associated handle bar arms, and wherein said connecting means includes a pin secured to each arm and extending through an aperture in the upper end of the adjacent brace.

3. An apparatus according to claim 2 wherein each of said pins extend through a selected one of a plurality of holes in the upper end of the adjacent brace.

* * * * *

UNITED STATES PATENT OFFICE
CERTIFICATE OF CORRECTION

Patent No. 4,015,407          Dated April 5, 1977

Inventor(s) Roger J. Bacon

It is certified that error appears in the above-identified patent and that said Letters Patent are hereby corrected as shown below:

Column 1, line 53: after "Saurer" delete "or" insert --on--;

line 56: after "issued" delete "of" insert --on--.

Column 2, line 29, change "groups" to --group--.

Column 3, line 57, after "mount" add --84--.

Column 6, line 2: change "groups" to --group--.

Signed and Sealed this

Twenty-fifth Day of September 1979

[SEAL]

Attest:

LUTRELLE F. PARKER
Attesting Officer    Acting Commissioner of Patents and Trademarks